(12) United States Patent
Ahn

(10) Patent No.: US 6,854,064 B2
(45) Date of Patent: Feb. 8, 2005

(54) ACPI COMPLAINT COMPUTER SYSTEM AND OVERTEMPERATURE PROTECTION METHOD THEREFOR

(75) Inventor: Hee-Geol Ahn, Kyunggi-do (KR)

(73) Assignee: Samsung Electronics Co., LTD, Suwon-si (KR)

( * ) Notice: Subject to any disclaimer, the term of this patent is extended or adjusted under 35 U.S.C. 154(b) by 609 days.

(21) Appl. No.: 09/906,750

(22) Filed: Jul. 18, 2001

(65) Prior Publication Data

US 2002/0104030 A1 Aug. 1, 2002

(30) Foreign Application Priority Data

Jan. 31, 2001 (KR) .......................................... 2001-4574

(51) Int. Cl.⁷ .............................. G06F 1/28; G06F 13/36
(52) U.S. Cl. ........................ 713/300; 713/324; 710/311
(58) Field of Search ................................ 713/310, 300, 713/324, 323; 714/22, 34; 710/311, 260

(56) References Cited

U.S. PATENT DOCUMENTS

| | | | |
|---|---|---|---|
| 5,230,055 A | * 7/1993 | Katz et al. ................... | 713/300 |
| 5,612,677 A | * 3/1997 | Baudry ........................ | 340/584 |
| 5,752,011 A | * 5/1998 | Thomas et al. .............. | 713/501 |
| 5,920,264 A | * 7/1999 | Kim et al. .................... | 340/584 |
| 5,930,110 A | * 7/1999 | Nishigaki et al. ........... | 361/686 |
| 6,092,926 A | * 7/2000 | Still et al. .................... | 374/141 |
| 6,105,142 A | * 8/2000 | Goff et al. ................... | 713/324 |
| 6,199,134 B1 | * 3/2001 | Deschepper et al. ........ | 710/311 |

FOREIGN PATENT DOCUMENTS

JP          11053062 A  *  2/1999  ............. G06F/1/20

OTHER PUBLICATIONS

IBM, Dynamic Power Management by Clock Speed Variation, Jan. 1, 1990, IBM Technical Disclosure Bulletin, vol. 32, Issue 8B, p. 373.*

Den, Bill Gates Intros Interactive PCs 0/01/96, Apr. 1, 1996, Newsgroups: clari.tw.new_media, p. 2.*

* cited by examiner

Primary Examiner—Thomas Lee
Assistant Examiner—Suresh Suryawanshi
(74) Attorney, Agent, or Firm—Robert E. Bushnell

(57) ABSTRACT

A computer system having an operating system which complies with the advanced configuration and power interface (ACPI) specification comprises a temperature sensor for sensing an inner temperature of the computer system and for generating an alarm signal when the sensed temperature exceeds a predetermined value, a bridge controller for generating a system management interrupt (SMI) in response to the alarm signal, a basic input-output system (BIOS) read-only memory (ROM) for storing a power management routine, and a power management processor for receiving a power control command signal generated by the power management routine in response to the SMI, and for generating a system command interrupt (SCI). The operating system causes the computer system to enter a "sleep" state in response to the SCI. The computer system enters the "sleep" state when the inner temperature exceeds the predetermined value, and restores data normally when the computer system resumes operation.

24 Claims, 2 Drawing Sheets

ACPI COMPLAINT COMPUTER SYSTEM AND OVERTEMPERATURE PROTECTION METHOD THEREFOR

CLAIM OF PRIORITY

This application makes reference to, incorporates the same herein, and claims all benefits accruing under 35 U.S.C. § 119 from my application ACPI COMPLIANT COMPUTER SYSTEM AND OVERTEMPERATURE PROTECTION METHOD THEREFOR filed with the Korean Industrial Property Office on Jan. 31, 2001 and there duly assigned Serial No.2001-4574.

BACKGROUND OF THE INVENTION

1. Field of the Invention

The present invention relates to an advanced configuration and power interface (ACPI) compliant computer system and overtemperature protection method therefor and, more particularly, to an ACPI compliant computer system and overtemperature protection method therefor in which the system automatically enters a "sleep" state complying with the ACPI specification when an inner temperature of the system exceeds a predetermined temperature.

2. Related Art

A computer system, particularly a portable computer, generally has many hardware devices incorporated in a small space. Accordingly, if the computer system is operated in an "on" state for a long time, an inner temperature thereof may be increased. As a result, the operation or function of easily heated or thermally sensitive devices, such as a central processing unit (CPU), may be adversely affected.

To prevent the easily heated devices from being damaged, it is necessary that the inner temperature of the system not exceed a predetermined temperature value. For this reason, various methods have been provided, for example, a method of driving fans, a method of decreasing clock frequency of the CPU, etc. However, these methods have a limit when it comes to reducing the inner temperature of the system. Accordingly, there has been developed a computer system which employs a technique for preventing the inner temperature from exceeding a predetermined value by entering a "sleep" or "suspend" state when the inner temperature of the system exceeds the predetermined value.

An example of a computer system which adopts the latter technique is a computer system using a known system management technique, such as an advanced power management (APM) technique. In a computer system which uses the APM technique, management of heat or temperature, as well as the APM, is implemented by basic input-output system (BIOS) instructions stored in a read-only memory (ROM). For example, when a request to transition from an "on" state to a "sleep" or "suspend" state due to an excess of inner temperature of the system occurs, the BIOS receives notice of the request via an operating system transparent interrupt known as a system management interrupt (SMI). Upon occurrence of such a request, the BIOS communicates the request to the operating system which, after notifying all operating system level device drivers, generates an SMI returning control to the BIOS. It is the responsibility of the BIOS to manipulate the computer system to enter the "sleep" state after performing a "save to disk" operation or the like, which causes a hard disk drive or the like to store the present status of the system. On wake-up, the BIOS again receives notice via an SMI, and restores date stored in the hard disk drive or the like before returning control to the operating system. Thus, in the computer system using APM, there is no problem in entering the "sleep" state in the case of an excessive inner temperature, and in restoring data stored in the hard disk or the like upon wake-up, since all actions are performed by the BIOS only.

However, when the technique for preventing excessive inner temperature is used in a computer system employing the newer ACPI jointly developed by Intel, Microsoft and Toshiba, a problem occurs. Namely, when a power management or configuration event occurs, the operating system is notified via an operating system visible interrupt, known as a system control interrupt (SCI). It is the operating system itself that directs all system and device power state transitions, and data storing and restoring, relative thereto. However, it is still the responsibility of the BIOS to manipulate the necessary software state information, and to control the necessary hardware to perform the requested action when a request relative to heat or temperature occurs, for example, when the inner temperature of the system exceeds the predetermined value. Also, the ACPI uses a new "sleep" type, S3 or S4, instead of the "save to disk" mode or the like used in the APM. When the "sleep" type S3 is executed, processor and cache context are lost, but hardware maintains memory and some processor configuration context. When the "sleep" type S4 is executed, the hardware has powered off all devices, although platform context is maintained. Thus, even though the BIOS still controls the computer system to enter the "sleep" state after performing the "save to disk" operation and the like in the presence of an excessive inner temperature, the operating system recognizes that the computer system must resume in the "sleep" type S3 or S4 upon wake-up. Therefore, the operating system does not correctly restore data stored by means of the BIOS, and a problem results in that the system is halted.

SUMMARY OF THE INVENTION

Therefore, it is an object of the present invention to provide an improved computer system and overtemperature protection method therefor, in which the system automatically enters a "sleep" state complying with the ACPI specification when an inner temperature of the computer system exceeds a predetermined temperature value, and normally restores data when the system resumes operation.

This and other objects are provided, according to the present invention, by a computer system and overtemperature protection method therefor employing an operating system which complies with the ACPI specification. The computer system of the present invention comprises a temperature sensor for sensing an inner temperature of the computer system, and for generating an alarm signal when the sensed temperature exceeds a predetermined temperature value, a bridge controller for generating a system interrupt in response to the alarm signal, a BIOS ROM for storing a power management routine of the computer system and a program for controlling input/outputs of the computer system, and a power management processor for receiving a power control command signal which is generated by the power management routine in response to the system interrupt, and for generating a power management interrupt. The operating system causes the computer system to enter the "sleep" state in response to the power management interrupt.

In a preferred embodiment of the present invention, the system interrupt is an SMI and the power management interrupt is an SCI. Also, the power management routine is stored in an SMI handler of the BIOS ROM.

The overtemperature protection method of the present invention comprises sensing an inner temperature of the computer system, determining whether or not the inner temperature is more than a predetermined temperature value, outputting an alarm signal to a bridge controller when the inner temperature is more than the predetermined temperature value, generating an SMI at the bridge controller in response to the alarm signal, outputting a power control command signal after executing a power management routine in response to the SMI, generating an SCI at a power management processor in response to the power control command signal, and controlling the computer system to cause it to enter a "sleep" state in response to the SCI by means of an operating system.

According to the present invention, the computer system enters the "sleep" state according to the ACPI specification when the inner temperature of the computer system exceeds the predetermined temperature value, and normally restores data when operation of the computer system is resumed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF PREFERRED EMBODIMENTS

Figure 1:
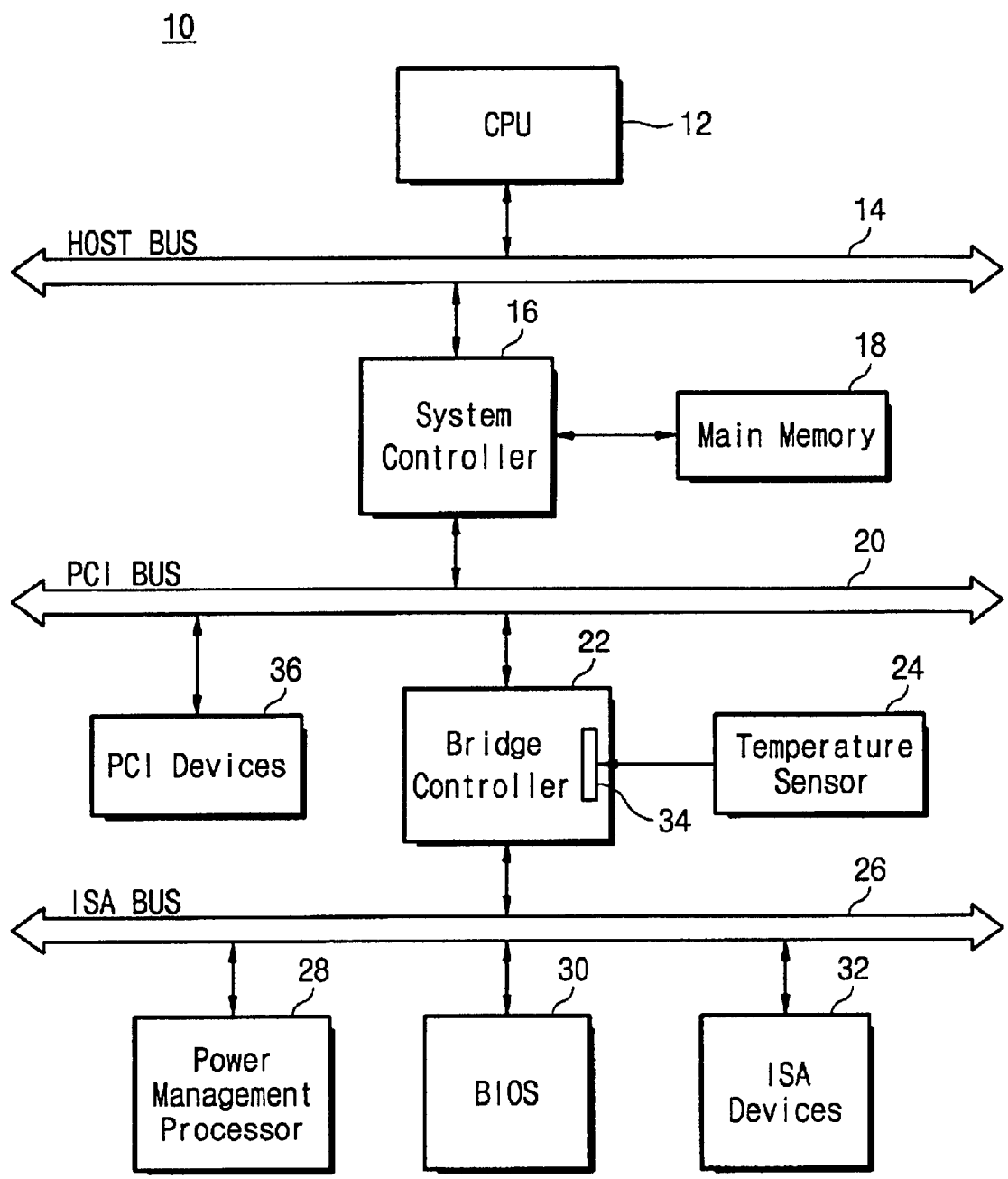
FIG. 1 is a block diagram of a computer system in accordance with a preferred embodiment of the present invention.

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be through and complete, and will fully covey the scope of the invention to those skilled in the art. Like reference numerals refer to like elements throughout.

FIG. 1 is a block diagram of a computer system in accordance with a preferred embodiment of the present invention.

Referring to FIG. 1, in the computer system 10, a CPU 12 is coupled to a host bus 14. The host bus 14 carries control, address and data signals for communicating with a system controller 16 and a main memory 18. The system controller 16 is coupled to the host bus 14 and to a PCI bus 20, and provides an interface between the CPU 12 and the main memory 18. Other devices which are not shown (for example, a second cache memory) may be coupled to the host bus 14 and the system controller 16. The system controller 16, coupled between the host bus 14 and the PCI bus 20, allows communication between the CPU bus and the PCI devices 36, and between the PCI devices 36 and the main memory 18. The PCI bus 20 carries control, address and data signals for providing an interface between the PCI devices 36 and the system controller 16. The PCI devices 36 may include I/O devices, such as a hard drive controller or a network card.

A bridge controller 22 provides an interface between the PCI bus 20 and an ISA bus 26. The bridge controller 22 also provides other computer system functions, such as timer/counter logic, direct memory access (DMA) interface, universal serial bus (USB) interface, X-bus support logic, and an integrated drive electronics (IDE) hard drive interface.

A temperature sensor 24 senses an inner temperature of the computer system 10 and transmits an alarm signal to the bridge controller 22 when the sensed temperature is more than a predetermined temperature value. A BIOS 30 includes a system management interrupt (SMI) handler for processing interrupts and routines driving I/O peripheral devices. I/O devices, such as a mouse, a keyboard and a modem, are coupled to the ISA bus 26.

Figure 2:
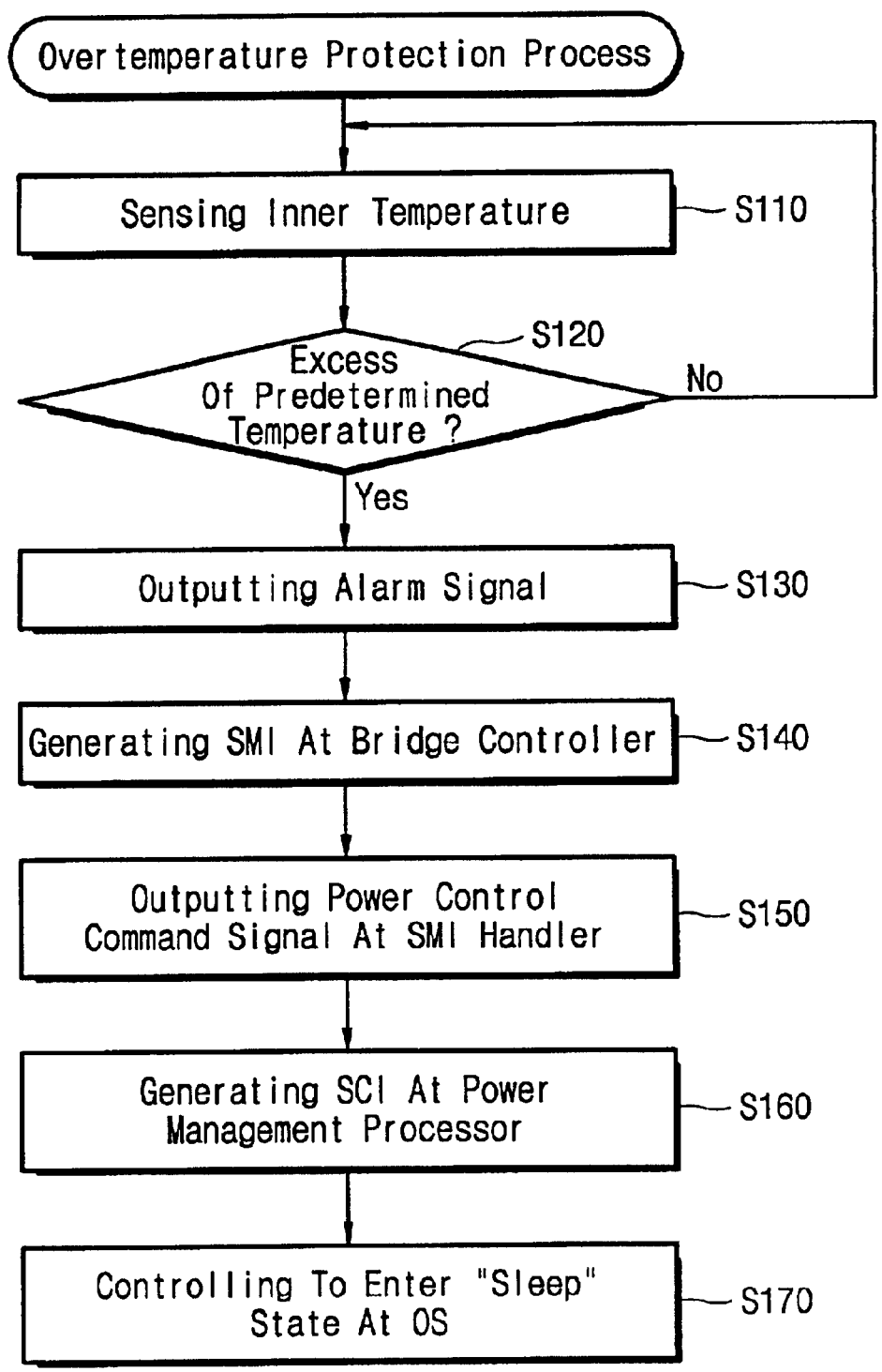
FIG. 2 is a flow chart showing the overtemperature protection method of the preferred embodiment of present invention performed when an inner temperature of the computer system is more than a predetermined temperature value.

The operation of the computer system 10 in accordance with a preferred embodiment of the present invention will now be described. In that regard, FIG. 2 is a flow chart showing the overtemperature protection method of the computer system of the present invention, performed when an inner temperature of the computer system is more than a predetermined temperature value.

First, temperature sensor 24 senses an inner temperature of the computer system 10 (S110). The temperature sensor 24 determines whether or not the inner temperature is more than a predetermined temperature value (S120). If the inner temperature is above the predetermined temperature value, the temperature sensor 24 generates an alarm signal (S130); if not, a return to step S110 is executed to sense again the inner temperature of the computer system 10. The alarm signal generated by the temperature sensor 24 is stored in a register 34 of bridge controller 22.

Then, the bridge controller 22 reads the value stored in the register 34, and generates a system management interrupt (SMI) when the value indicates entry of the "sleep" state (S140).

When the SMI is generated, CPU 12 causes an SMI handler to be executed. A power control command signal is generated by the SMI handler since it is programmed to output the power control command signal in response to the SMI. The power control command signal is outputted to power management processor 28 (S150).

The power management processor 28 generates a system control interrupt (SCI) in response to the power control command signal (S160).

The operating system controls the computer system 10 to enter the "sleep" state in response to the SCI. According to ACPI specification, the "sleep" state is classified into one of five types, i.e., S1 to S5. Of the five "sleep" types, "sleep" type S3 or S4 is executed according to the selection of the user when the inner temperature exceeds the predetermined temperature value. For example, when the user selects the maximum power saving mode in the power management option of "WINDOWS 2000", "sleep" type S4 is executed, and when the user does not select the maximum power saving mode, "sleep" type S3 is executed. When the "sleep" type S3 is executed, processor and cache context are lost, but hardware maintains memory and some processor configuration context. When the "sleep" type S4 is executed, the hardware has powered off all devices, although platform context is maintained.

When the user turns on the power switch of the computer system 10, the operating system executes a resuming operation corresponding to the selected "sleep" type S3 or S4.

As is apparent from the foregoing description, it can be appreciated that the present invention provides a computer system and overtemperature protection method therefor in which a "sleep" state is entered, by means of control of an operating system and in compliance with the ACPI specification, when the inner temperature of the computer system exceeds a predetermined temperature value, and data is restored when the computer system resumes operation from the "sleep" state.

In the drawings and specification, there has been disclosed a typical preferred embodiment of the invention and, although specific terms are employed, they are used in a generic and descriptive sense only and not for purpose of limitation, the scope of the invention being set forth and limited only by the following claims.

What is claimed is:

1. A computer system having an operating system which complies with an advanced configuration and power interface (ACPI) specification, comprising:
   a temperature sensor for sensing an inner temperature of said computer system and for generating an alarm signal when the sensed inner temperature exceeds a predetermined value;
   a bridge controller for generating a first interrupt in response to said alarm signal from said temperature sensor;
   a basic input-output system (BIOS) read-only memory (ROM) for storing a power management routine of said computer system and a program for controlling inputs and outputs of said computer system, said power management routine generating a power control command signal in response to said first interrupt; and
   a power management processor for receiving said power control command signal generated by said power management routine, and for generating a second interrupt;
   wherein said operating system controls said computer system so as to cause said computer system to enter a sleep state in response to said second interrupt.

2. The computer system according to claim 1, wherein said first interrupt comprises a system management interrupt (SMI).

3. The computer system according to claim 1, wherein said second interrupt comprises a system control interrupt (SCI).

4. The computer system according to claim 1, wherein said power management routine is stored in a system management interrupt (SMI) handler of said BIOS ROM.

5. The computer system according to claim 1, wherein said sleep state comprises one of a sleep type S3 and a sleep state type S4 which comply with the ACPI specification.

6. An overtemperature protection method for use in a computer system having an operating system which complies with an advanced configuration and power interface (ACPI) specification, comprising the steps of:
   sensing an inner temperature of said computer system;
   determining whether said inner temperature is greater than a predetermined value;
   outputting an alarm signal when said inner temperature is greater than said predetermined value;
   generating a system management interrupt (SMI) in response to said alarm signal;
   outputting a power control command signal after executing a power management routine in response to said SMI;
   generating a system control interrupt (SCI) in response to said power control command signal; and
   controlling said computer system to enter a sleep state in response to said SCI.

7. The method according to claim 6, wherein said alarm signal is outputted to a bridge controller having a register in which said alarm signal is stored.

8. The method according to claim 7, wherein said alarm signal is outputted by a temperature sensor.

9. The method according to claim 7, wherein said SMI is generated by said bridge controller after said bridge controller reads said alarm signal stored in said register.

10. The method according to claim 6, wherein said SMI is generated by a bridge controller.

11. The method according to claim 6, wherein said SCI is generated by a power management processor.

12. The method according to claim 6, wherein said computer system is controlled by said operating system to enter the sleep state.

13. In computer system having an operating system which complies with an advanced configuration and power interface (ACPI) specification, on overtemperature protection arrangement comprising:
   sensor means for sensing an inner temperature of said computer system and for generating an alarm signal when the sensed inner temperature exceeds a predetermined value;
   first interrupt means for generating a first interrupt in response to said alarm signal generated by said sensor means;
   signal generating means responsive to said first interrupt for generating a power control command signal; and
   second interrupt means responsive to said power control command signal for generating a second interrupt;
   wherein said computer system enters a sleep state in response to said second interrupt.

14. In the computer system according to claim 13, wherein said first interrupt comprises a system management interrupt (SMI).

15. In the computer system according to claim 13, wherein said second interrupt comprises a system control interrupt (SCI).

16. In the computer system according to claim 13, wherein said first interrupt means comprises a bridge controller connected to said sensor means.

17. In the computer system according to claim 16, wherein said first interrupt comprises a system management interrupt (SMI).

18. In the computer system according to claim 13, wherein said signal generating means comprises a power management routine stored in a basic input-output system (BIOS) read-only memory (ROM) of said computer system.

19. In the computer system according to claim 18, wherein said power management routine is stored in a system management interrupt (SMI) handler of said BIOS ROM.

20. In the computer system according to claim 13, wherein said second interrupt means comprises a power management processor.

21. In the computer system according to claim 20, wherein said second interrupt comprises a system control interrupt (SCI).

22. In the computer system according to claim 13, wherein said sleep state comprises one of a sleep type S3 and a sleep state type S4 which comply with the ACPI specification.

23. The computer system according to claim 1, wherein said bridge controller comprises a register for storing the alarm signal generated by said temperature sensor.

24. In the computer system according to claim 16, wherein said bridge controller comprises a register for storing the alarm signal generated by said sensor means.

* * * * *